(12) United States Patent
Bruck et al.

(10) Patent No.: US 8,066,174 B2
(45) Date of Patent: Nov. 29, 2011

(54) FILLER ROTATED FRICTION STIR WELDING

(75) Inventors: Gerald J. Bruck, Oviedo, FL (US); Michael Ott, Muelheim an der Ruhr (DE); David W. Hunt, Orlando, FL (US); Petya M. Georgieva, Oviedo, FL (US)

(73) Assignees: Siemens Energy, Inc., Orlando, FL (US); Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/771,329

(22) Filed: Apr. 30, 2010

(65) Prior Publication Data

US 2011/0266330 A1 Nov. 3, 2011

(51) Int. Cl.
*B23K 20/12* (2006.01)

(52) U.S. Cl. ........................... 228/112.1; 228/2.1

(58) Field of Classification Search ........................ None
See application file for complete search history.

(56) References Cited

U.S. PATENT DOCUMENTS

| | | | |
|---|---|---|---|
| 5,794,835 A * | 8/1998 | Colligan et al. | 228/2.1 |
| 5,829,664 A * | 11/1998 | Spinella et al. | 228/112.1 |
| 6,457,629 B1 * | 10/2002 | White | 228/112.1 |
| 6,543,671 B2 | 4/2003 | Hatten et al. | |
| 6,572,007 B1 * | 6/2003 | Stevenson et al. | 228/112.1 |
| 7,163,138 B1 * | 1/2007 | Dudt et al. | 228/112.1 |
| 7,455,212 B2 | 11/2008 | Mika | |
| 2002/0027154 A1 * | 3/2002 | Satou et al. | 228/112.1 |
| 2002/0047037 A1 * | 4/2002 | Shinoda et al. | 228/112.1 |
| 2003/0072292 A1 * | 4/2003 | Yoon et al. | 370/342 |
| 2003/0098335 A1 * | 5/2003 | Saeki et al. | 228/112.1 |
| 2004/0265503 A1 * | 12/2004 | Clayton et al. | 427/446 |
| 2006/0049234 A1 * | 3/2006 | Flak et al. | 228/112.1 |
| 2006/0068492 A1 * | 3/2006 | Choi et al. | 435/293.2 |
| 2006/0102689 A1 * | 5/2006 | Trapp et al. | 228/2.1 |
| 2006/0163328 A1 * | 7/2006 | Subramanian et al. | 228/112.1 |
| 2006/0289603 A1 * | 12/2006 | Zettler et al. | 228/2.1 |
| 2007/0040006 A1 * | 2/2007 | Charles et al. | 228/112.1 |
| 2007/0272724 A1 * | 11/2007 | Christopherson | 228/2.1 |
| 2008/0006678 A1 * | 1/2008 | Packer et al. | 228/114.5 |
| 2008/0041921 A1 * | 2/2008 | Creehan et al. | 228/101 |
| 2009/0068492 A1 | 3/2009 | Fujii et al. | |
| 2009/0200275 A1 * | 8/2009 | Twelves et al. | 219/76.1 |
| 2009/0236045 A1 * | 9/2009 | Burton et al. | 156/349 |
| 2010/0147925 A1 * | 6/2010 | Hanlon et al. | 228/112.1 |
| 2010/0178526 A1 * | 7/2010 | Fujii et al. | 428/615 |

FOREIGN PATENT DOCUMENTS

| | | |
|---|---|---|
| JP | 11-156561 A * | 6/1999 |
| JP | 2001-259863 A * | 9/2001 |
| JP | 2004-025296 A * | 1/2004 |

OTHER PUBLICATIONS

Machine translation of JP-2004-025296A (no date available).*

* cited by examiner

*Primary Examiner* — Kiley Stoner

(57) ABSTRACT

A friction stir welding method including: feeding a filler material through a first passage in a friction stir weld tool and into a substrate during friction stir welding of the substrate; and rotating the filler material with respect to the substrate while feeding the filler material. In this method, heat generated by rotational frictional contact of the filler material contributes to plasticization of the filler material.

18 Claims, 5 Drawing Sheets

FILLER ROTATED FRICTION STIR WELDING

FIELD OF THE INVENTION

The invention relates to a method for friction stir welding. More particularly, it relates to a method of stir welding using filler material, and rotating the filler material during the weld process.

BACKGROUND OF THE INVENTION

A technique for welding materials known as friction stir welding is recognized among the conventional methods of joining substrates. In conventional frictional stir welding, a non-consumable cylindrical tool may have a flat surface (i.e. shoulder) on the working end with a pin in the center. When the tool is plunged into a substrate, or between adjacent substrate pieces, the flat surface rests flush against the surface of the substrate, and the pin extends into the substrate. The tool is rotated and simultaneously translated relative to the substrate. The force of the translation and rotation plasticizes the substrate in the vicinity of the shoulder and pin. The rotation blends the substrate and moves substrate around the pin which permits the pin to move through the substrate. The plasticized substrate material is relocated to the wake of the pin, where it forms a weld bead. Importantly, the substrate material is plasticized, as opposed to melted, during this operation. Melting is specifically avoided, so that properties of the weld, which is made of plasticized and then solidified substrate, remain close to those of the substrate itself.

In a recent variation, filler material is fed through the non-consumable tool. This filler material exits the tool and contacts the substrate, where it is then plasticized and mixed into the weld by the weld tool. Using filler material permits the composition and volume of the weld bead to be adjusted as desired because the filler material is dispersed throughout the entire volume of the weld bead. This is different from friction surfacing, where a consumable material is rotated on a substrate's surface to generate heat via frictional contact. In friction surfacing heat causes plastic deformation which leaves some of the consumable material on the surface of the substrate. This is different than friction stir welding because surface treatment seeks only to treat the substrate's surface while avoiding significant penetration of the rotating material into the substrate. In friction surfacing only the surface of a substrate is built upon. Deep penetration of the consumable material in friction surfacing is not possible and not intended because the consumable is meant to deposit on the surface thereby building it up and (often) imparting different surface composition and properties.

Conventional friction stir welding has disadvantages. For example, once a weld bead of desired length is reached, the tool must either lift out of (i.e. retract from) the substrate, or must run past the edge of the substrate. In the first case, the tool will leave a weld tool crater or cavity (hereafter referred to as a crater) of tool tip geometry in the weld bead as it is extracted from the substrate because it is no longer plasticizing substrate, so there is no plasticized substrate to move into its wake. In the second case, once the leading edge of the tool reaches the edge of the substrate, it is again without material to plasticize and direct toward its wake, and a void may be left in the weld bead at the edge of the substrate. Run off tabs may be used to supply the feed of plasticized material but these tabs are often difficult to incorporate (i.e. fixture and support), especially on edges of geometrically complex parts. Thus there is room for improvement in the art.

BRIEF DESCRIPTION OF THE DRAWINGS

The invention is explained in the following description in view of the drawings that show.

DETAILED DESCRIPTION OF THE INVENTION

The present inventors have innovatively recognized that a friction stir weld process using filler material can be improved upon by rotating, i.e. spinning, the filler material itself while the filler material is fed into the friction stir weld tool. The inventors have realized that in conventional friction stir welding using filler material the heat required to plasticize the filler material must come from frictional heat generated by the weld tool. Proper heating of the filler material is required for proper incorporation in a friction stir weld bead. Being able to generate more heat in the filler material and being better able to control that heat, by rotating the filler material, would enable better control of the volume and composition of filler material within the friction stir weld bead. The weld tool may be operated at lower temperatures when it is not the only source of heat for the filler material, and this may increase the lifetime of the weld tool. Further, more available heat for the weld process may permit larger friction stir weld beads, which in turn may permit welding of larger and thicker substrate pieces. Filler material may be a solid rod, tubular, or tubular with a flux and/or powder material core. In the cases where the filler is tubular and filled with flux and/or powder, the tubular portion of the filler material would be rotated, and the flux and/or powder would rotate to the extent any rotation would be imparted to it by the tubular material.

An even further improvement may include preheating the filler material before it is plasticized, which will increase the above-listed benefits. Such preheating can be accomplished by electrically heating the filler material, or by frictional contact with the weld tool, or any other known method.

Figure 1:
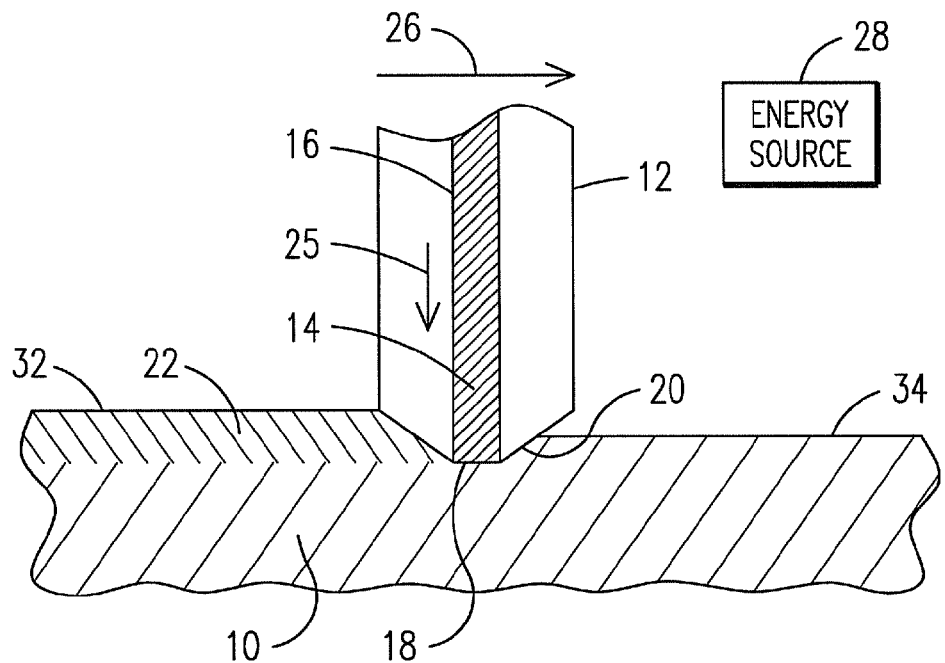
FIG. 1 is a side view of a weld tool creating a weld in a substrate without a gap in the substrate.
Figure 2:
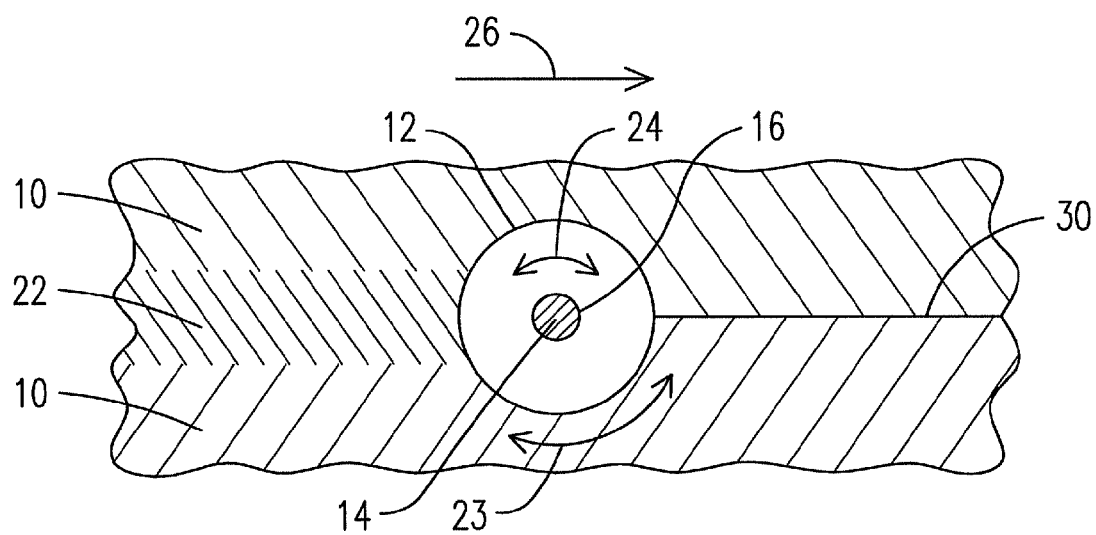
FIG. 2 is a top view of the weld tool creating a weld in a substrate of FIG. 1.

Turning to the drawings, shown in FIGS. 1 and 2 are a substrate 10, a weld tool 12, filler material 14 which is fed through a weld tool first passage 16 and out a weld tool opening 18. Also seen is the weld bead 22 that results when the filler material is fed as indicated by filler material feed direction 25, the weld tool 12 is translated along weld tool movement direction 26, and substrate 10 in the area ahead of the weld tool 12 (with respect to the weld tool movement direction 26) encounters a weld tool friction surface 20, (i.e.

a "flow arm'), is plasticized and mixed with plasticized filler material 14, and moved into the wake behind the weld tool 12. As can be seen in FIG. 2, the weld tool 12 is rotated as indicated by weld tool rotation 23, and filler material 14 is rotated as indicated by filler material rotation 24. As can be seen, both rotations 23, 24 can be in either direction, and each can be in the same direction as the other, or a different direction as the other. A second source of energy 28 may be used to preheat the filler material.

FIGS. 1 and 2 depict a weld scenario where a weld bead 22 may be created in a single piece of substrate 10, or two pieces of substrate 10 to be joined along weld line 30. There is no gap in or between the substrate 10 in this scenario. As a result, a weld bead surface 32 rises above a substrate surface 34 to accommodate the material volume added by the addition of filler material 14. The additional heat generated by spinning the filler material 14 is created by frictional contact of the filler material 14 with any or all of the weld tool 12, the substrate 10, plasticized substrate and plasticized filler material. The filler material may plasticize quicker when rotated than when not rotated, and this may increase the speed with which the weld bead 22 can be formed. Better plasticization also allows for better mixing of the plasticized filler material with plasticized substrate material. This can permit a more uniform weld bead 22 composition, or can permit adjustment of the composition of the weld bead on-the-fly as the weld bead 22 is formed. In an embodiment where a more uniform composition is desired, the rotational speed can be increased. This increases plasticization ease of integration of the filler material 14 into the plasticized substrate. The ability to adjust the rotational speed and direction affords a greater control than present in the prior art, where only the weld tool 12 rotates, and thus only the rotation of the weld tool 12 can be adjusted.

Figure 3:
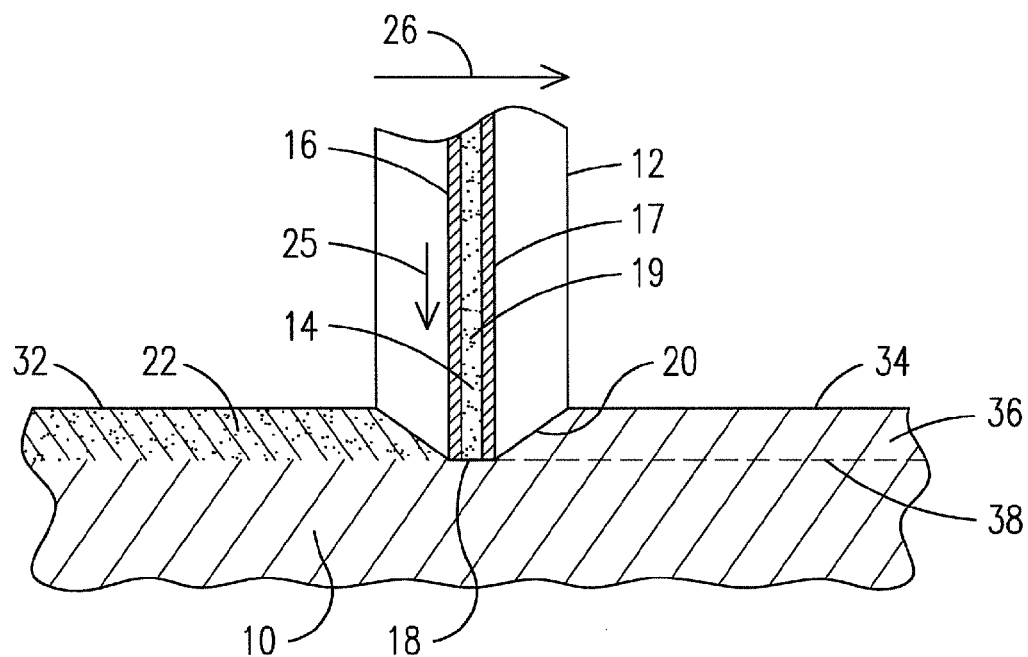
FIG. 3 is a side view of a weld tool creating a weld in a substrate with a gap in the substrate.
Figure 4:
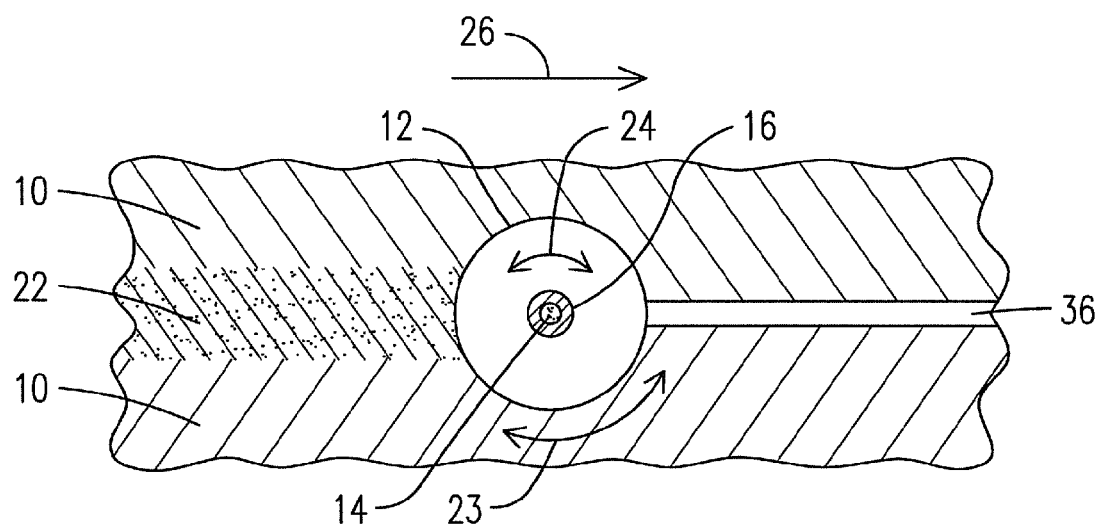
FIG. 4 is a top view of the weld tool creating a weld in a substrate of FIG. 3.

FIGS. 3 and 4 depict a weld scenario where there exists a gap 36 with gap bottom surface 38. The gap 36 is either in the substrate 10, or an area between adjacent edges of the two substrates 10 to be joined along the weld line 30. Gap 36 may be sized to account for the volume added by filler material 14 during the friction stir weld process, such that the weld bead surface 32 is coplanar with substrate surface 34 in the resulting weld bead 22 as can be seen in FIG. 3. Other embodiments are envisioned where the weld bead surface 32 may be above or below the substrate surface 34 as desired. Also shown is filler material 14 in the form of a tube 17 filled with a powder 19.

Figure 5:
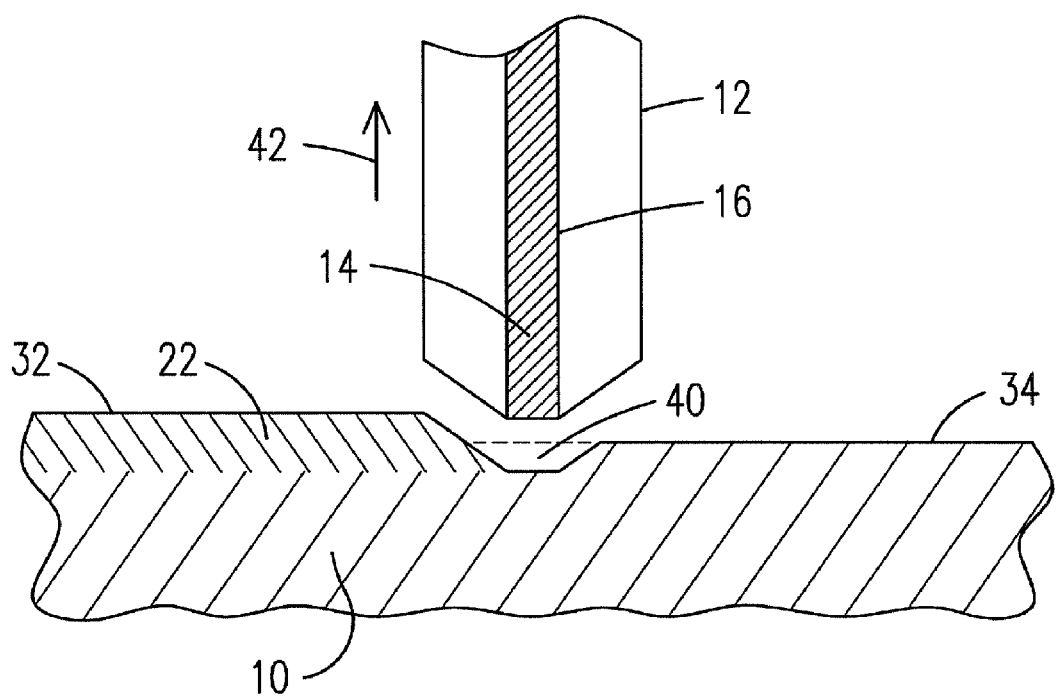
FIG. 5 is a side view of a crater left in a substrate when the weld tool creating a weld in a substrate of FIG. 1 is retracted.

FIGS. 5-8 discuss a weld tool crater 40 created when the completion of the welding process occurs at some point other than at an end of the substrate 10, and an inventive method for eliminating it. FIG. 5 shows the weld tool crater 40 that results when the weld tool 12 is retracted 42 from the substrate 10 at the completion of the welding process of the prior art. Feeding of the filler material has conventionally been halted before the weld tool 12 retraction 42 begins. This is so because the weld tool 12 is the source of heat for plasticization of the filler material 14, and at that point weld tool 12 would no longer be generating heat for plasticization because it would no longer be in contact with the substrate 10. Weld tool crater 40 may either be filled by a secondary technique, or may occur in a portion of the substrate 10 that is not part of the finished product. The former case may result in additional labor costs to eliminate the weld tool crater 40, and the latter case may result in additional labor and lost material in removing the substrate 10 that is not part of the finished product.

Figure 6:
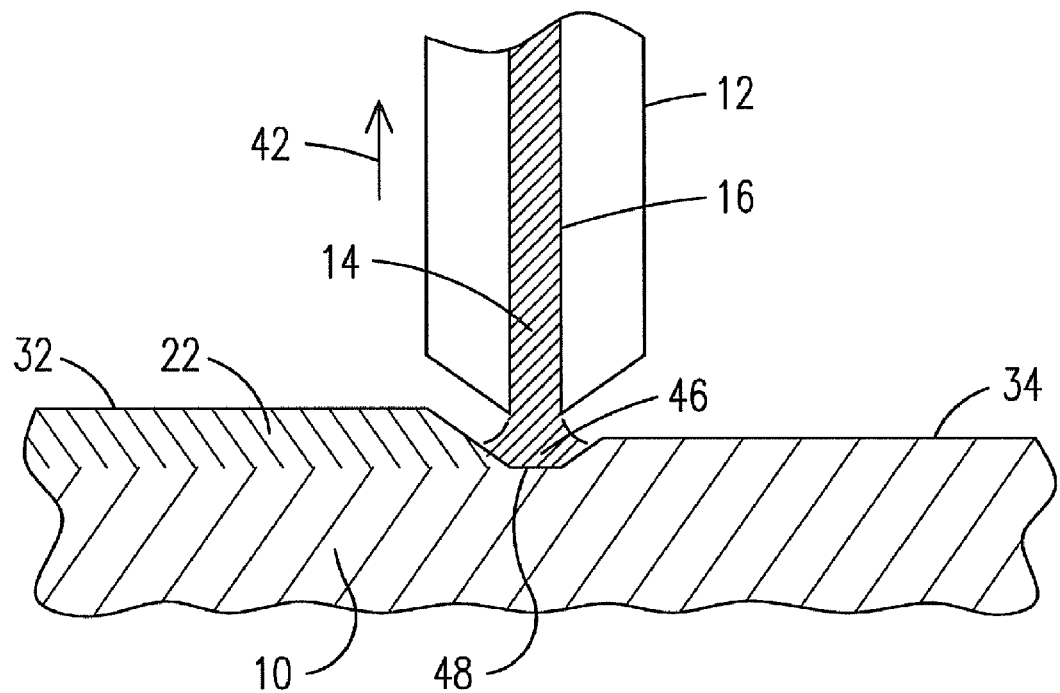
FIG. 6 is a side view of a method of filling the crater shown in FIG. 5.
Figure 7:
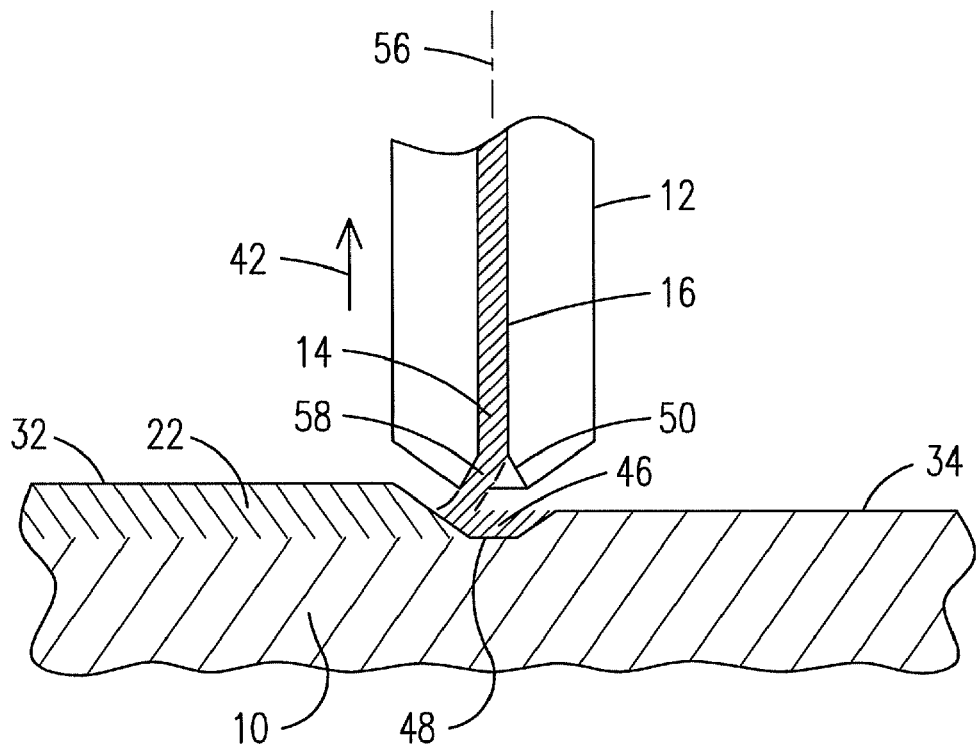
FIG. 7 is the weld tool of FIG. 6 further retracted.
Figure 8:
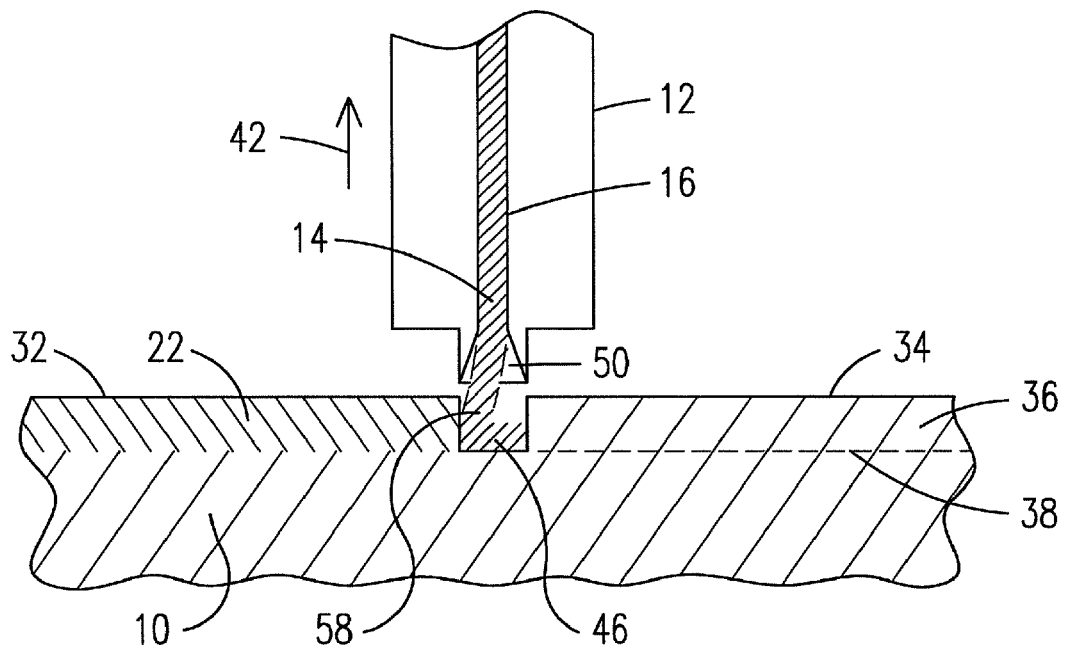
FIG. 8 is a side view of a method of filling the crater left in a substrate when the weld tool creating a weld in a substrate of FIG. 3 is retracted.

FIG. 6 depicts weld tool crater filler material 46. Weld tool crater filler material 46 continues to rotate as it is fed out of the weld tool 12 while weld tool 12 is retracted 42. As a result, weld crater filler material 46 plasticizes as it contacts the crater surface 48. While the crater surface 48 is covered by plasticized crater filler material 46, weld tool crater filler material 46 continues to be fed onto and rotate with respect to the prior deposited weld tool crater filler material 46. Thus the pool of weld tool crater filler material 46 pools in and eventually fills the weld tool crater, as shown in FIG. 7. This may continue until the weld tool crater 40 is filled, or beyond, or may stop before weld tool crater 40 is completely filled, if desired. For example, filler material 14 may be fed and plasticized until even with weld bead surface 32. It may be continued beyond that point, or it may be filled to some point in between, such that is creates a step. These and other variations are contemplated to be within the scope of the disclosure. FIG. 7 also depicts a weld tool 12 with a second passage 50 that diverges in diameter the further downstream it gets from the weld tool first passage 16. Second passage 50 permits greater movement of the filler material end 58, such that a filler material end 58 is free to move off a feed axis 56, which may permit the filler material end 58 to cover a wider area of substrate 10 when the weld tool 12 is relatively less retracted. In addition, the weld tool 12 may be translated as necessary during the crater filling operation in order to enhance the crater filling operation. FIG. 8 shows the crater filling technique of the present invention with another configuration of weld tool 12 when there exists a groove 36 as depicted in FIGS. 3 and 4. The crater filling process is essentially the same, except that some filler material 14 may fill in some of the groove 36 as well.

Figure 9:
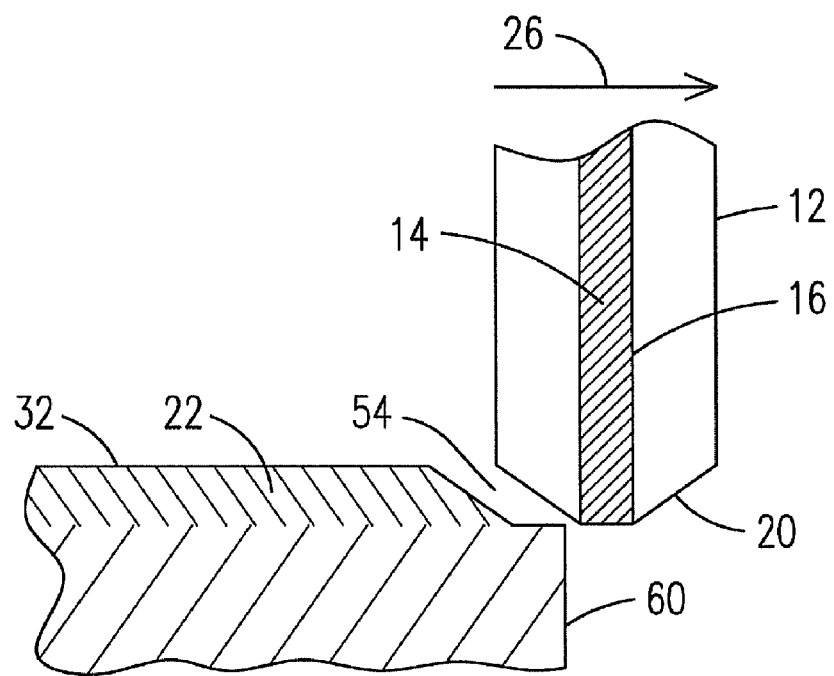
FIG. 9. is a side view of a prior art crater left in a substrate when a weld tool creating a weld runs past an edge of a substrate.
Figure 10:
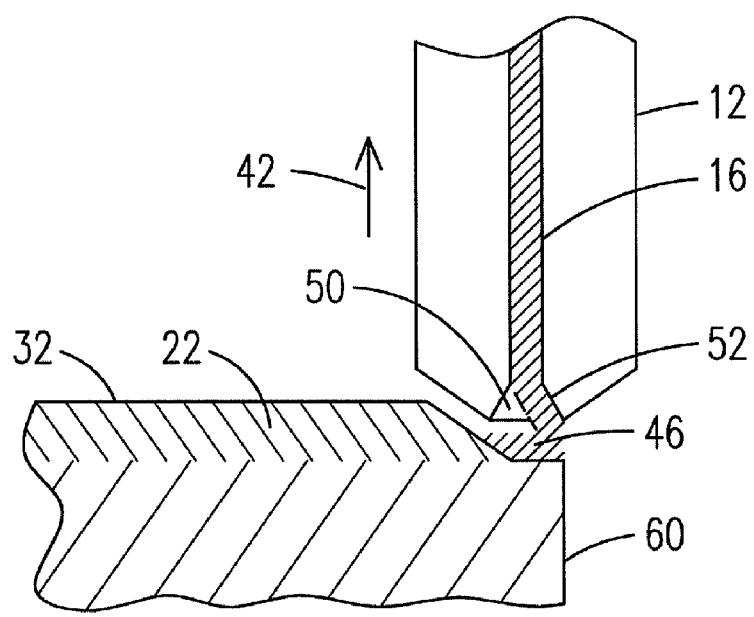
FIG. 10. is a side view of a method of filling a crater left in a substrate when a weld tool creating a weld in a substrate of FIG. 3 runs past an edge of the substrate.

FIG. 9 depicts another type of weld tool crater 54 that is left when the weld process ends at a substrate end 60. It can be seen that because the weld tool 12 was translating in weld tool movement direction 26, and weld tool friction surface 20 moved substrate 10 from in front of the weld tool 12 to the wake of weld tool 12, once weld tool 12 reached the substrate end 60, there was no substrate material in front of weld tool 12 to move. Consequently, as weld tool 12 travels out of substrate 10, weld tool crater 54 remains. As can be seen in FIG. 10, using the inventive method disclosed herein, in this embodiment using a weld tool with a diverging second passage 50, rotating filler material 14 can be used to fill in weld tool crater 54. Filling in weld tool crater 54 is slightly more difficult in this scenario because there is no wall on one side of the substrate 10 to contain the weld tool crater filler material 46. As a result, the retraction of weld tool 12 must be more closely controlled. Further, the weld tool 12 may be translated during the retraction 42, in order to more fully and evenly fill the weld tool crater 54.

In both types of weld tool craters, 40, 54, the composition of the weld bead 22 in general may be different that the composition of the weld bead 22 in the area that was the weld tool crater 40, 54. This is so because the majority of the weld bead 22 will be composed of substrate 10 mixed with filler material 14, but in the area where there was a weld tool crater 40, 54, the weld bead 22 will be composed only of filler material 14. In an embodiment this may be overcome by ending the stir weld process in the conventional manner, replacing the filler material 14 used during the friction stir weld process with a filler material 14 comprising the ultimately desired weld bead composition, and filling the crater using the second filler material 14. Either method is an improvement over the prior art in that there is no weld tool crater left in the substrate using the instant method.

It has been shown that the inventive method disclosed increases the amount of heat used to plasticize a filler material in a friction stir weld process. As a result, when compared to friction stir weld processes where the filler material is not rotated, the volume and distribution of plasticized material in a friction stir weld can be better controlled, the weld bead volume can be increased, and the friction stir weld process can occur more quickly. The above benefits can be realized to a greater degree if the filler material is preheated before being plasticized.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A friction stir welding method comprising:
   rotating a tip of a friction stir weld tool while moving the tip of the friction stir weld tool orthogonal to a friction stir weld tool longitudinal axis, wherein a friction surface on the tip is configured to a create the friction stir weld by penetrating the substrate to a bottom of a friction stir weld;
   feeding a filler material through a first passage in the friction stir weld tool and into the substrate wherein the filler material emerges from the tip at the bottom of the friction stir weld; and
   rotating the filler material as the filler material enters the first passage, wherein the rotation of the filler material is about a longitudinal axis of the first passage, is independent of the rotation of the friction stir weld tool, and is effective to create relative circumferential movement between the filler material within the first passage and a surface of the first passage.

2. The method of claim 1, wherein the frictional contact is with at least one of the substrate, a plasticized portion of the substrate, plasticized filler material, and the friction stir weld tool.

3. The method of claim 1, comprising feeding the filler material from the first passage through a second passage in the friction stir weld tool, wherein a second passage axis, a first passage axis, and a feed axis are common, a second passage diameter is greater than a first passage diameter, and a leading portion of the filler material is free to deviate from the feed axis in the second passage before being plasticized.

4. The method of claim 3, wherein the second passage diverges in diameter from the first passage to a tip of the friction stir weld tool.

5. The method of claim 1, comprising completing the friction stir welding of the substrate by retracting the friction stir weld tool from the substrate to create a gap between the friction stir weld tool and a friction stir weld tool crater, and feeding the rotating filler material into the friction stir weld tool crater, thereby filling the friction stir weld tool crater with plasticized filler material.

6. The method of claim 5, further comprising moving the friction stir weld tool orthogonal to a friction stir weld tool longitudinal axis while filling the friction stir weld tool crater with plasticized filler material.

7. The method of claim 1, comprising heating the filler material with energy from a second source.

8. The method of claim 1, wherein at least one of a rotational speed and a rotational direction of the filler material is controlled to control the plasticization of the filler material, thereby controlling a distribution of the filler material within the substrate.

9. The method of claim 1, wherein feed pressure on the filler material is controlled to control the plasticization of the filler material, thereby controlling a distribution of the filler material within the substrate.

10. The method of claim 1, wherein the filler material is selected from a group consisting of solid rod, tube, and tubular with a flux and/or powder material core.

11. A method of joining substrates comprising:
    abutting a first substrate with a second substrate along a joint;
    positioning a rotational frictional heating source between and in contact with both substrates, wherein the rotational frictional heating source comprises a friction surface at a tip configured to create a friction stir weld joining the first substrate and the second substrate by penetrating the first substrate and the second substrate to a bottom of the friction stir weld;
    forming a weld bead by advancing the rotational frictional heating source between the first substrate and the second substrate along the joint to plasticize and mix first substrate material adjacent the joint, second substrate material adjacent the joint;
    rotating filler material as the filler material enters a passage through the rotational frictional heating source, the rotation being about a longitudinal axis of the passage, independent of a rotation of the frictional heating source, and effective to create relative circumferential movement between the filler material within the first passage and a surface of the first passage, and
    advancing the filler material such that it emerges from the rotational frictional heating source at the bottom of the friction stir weld joint.

12. The method of claim 11, wherein the rotational frictional heating source comprises a passage comprising a passage longitudinal axis through which the filler material is introduced, and wherein the passage diverges in diameter toward a downstream end, thereby enabling a longitudinal axis of a downstream portion of the filler material to divert from the passage longitudinal axis.

13. The method of claim 11, comprising completing the weld bead by continuing to feed rotating filler material into the joint while retracting the rotational frictional heating source away from the joint and creating a gap between the rotational frictional heating source and the joint, thereby filling any crater left by the rotational frictional heating source with plasticized filler material.

14. The method of claim 13, further comprising moving the rotational frictional heating source orthogonal to a frictional heating source longitudinal axis while filling the gap with plasticized filler material.

15. The method of claim 11, comprising heating the filler material with energy from a second source.

16. The method of claim 11, wherein at least one of a rotational speed and a rotational direction of the filler material is controlled to control the plasticization of the filler material, thereby controlling a distribution of the filler material within the weld bead.

17. The method of claim 11, wherein feed pressure on the filler material is controlled to control the plasticization of the filler material, thereby controlling a distribution of the filler material within the weld bead.

18. The method of claim 11, wherein the filler material is selected from a group consisting of solid rod, tube, and tubular with a flux and/or powder material core.

* * * * *